June 4, 1940. J. HANSEN 2,202,852
VALVE
Filed Feb. 3, 1938
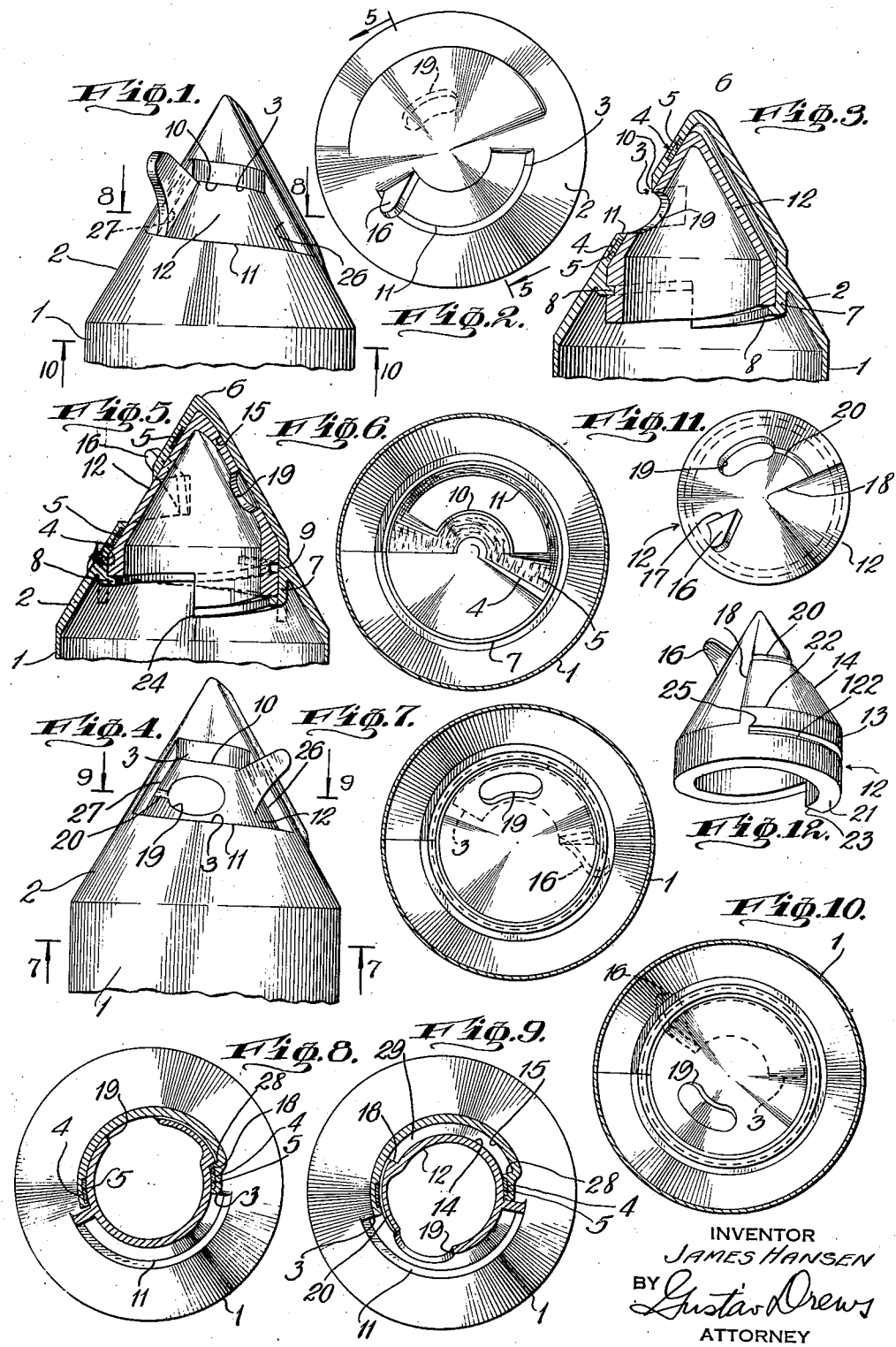
INVENTOR
JAMES HANSEN
BY Gustav Drews
ATTORNEY Patented June 4, 1940

2,202,852

UNITED STATES PATENT OFFICE 2,202,852

VALVE

James Hansen, Flushing, N. Y., assignor of one-half to Gustav Drews, Brooklyn, N. Y.

Application February 3, 1938, Serial No. 188,411

41 Claims. (Cl. 221—60)

This invention relates to valves in general and more especially to valves or closures for collapsible tubes and the like.

With the valves of this kind heretofore used, considerable difficulty has been encountered in simultaneously producing a closure that is liquid-tight as well as air-tight, the cost of production of which can be maintained at a minimum and the closing action of which will not be accompanied by objectionable secretions or extrusions. The present invention has for an object simultaneously to solve the several problems here listed and to produce a collapsible tube having a closure which is not only air-tight, and liquid-tight but can also be produced at very low cost and be operated without any objectionable secretions or extrusions.

It is still another object of the present invention to provide an improved valve or closure for a collapsible tube which will during the closing movement simultaneously urge or pneumatically cause the contents to compress in an inward direction so as to prevent the extrusion or secretion of any part thereof during the final closing movement.

These and other features, capabilities and advantages of the invention will appear from the subjoined detail description of one specific embodiment thereof illustrated in the accompanying drawing in which Figure 1 is a fragmental side elevation of a tube equipped with a valve in closed position;

Fig. 2 is a plan view of the same;

Fig. 3 is a fragmental section on the line 5—5 of Fig. 2 but with the valve in open position;

Fig. 4 is a fragmental side elevation similar to Fig. 1 but with the valve shown in open position;

Fig. 5 is a section on the line 5—5 of Fig. 2;

Fig. 6 is a section on the line 10—10 of Fig. 1 before the movable portion of the valve has been secured in place;

Fig. 7 is a section on the line 7—7 of Fig. 4;

Fig. 8 is a section on the line 8—8 of Fig. 1;

Fig. 9 is a section on the line 9—9 of Fig. 4;

Fig. 10 is a section on the line 10—10 of Fig. 1;

Fig. 11 is a plan of the movable portion of the valve removed from the tube proper; and Fig. 12 is a perspective of the movable portion of the valve removed from the tube proper.

In the embodiment shown, the upper portion of a flexible tube 1 composed of some suitable moldable readily yieldable material such as lead, tin or the like, is shown as pressed into a spiral cone-like formation 2 having an opening 3 with a recess 4 spaced from and adjacent to the outline of the opening to accommodate a yieldable washer 5 composed of cork, cork composition or the like. Extending from the inner face of the termination 2 axially away from the closed end 6 there is a skirt 7 following the outline of the single convolution of a spiral, the free end of which may be folded over to form the thread 8 shown in Fig. 5.

Preferably the inner face 9 of the termination 2 above the skirt 7 is substantially cylindrical, the upper edge of the cylindrical portion 9 however conforming and parallel to the pitch of the helix or spiral formed by the thread 8 after the lower edge of the skirt 7 has been bent inwardly. Above the upper edge of the cylindrical surface 9, the inner face of the termination 2 conforms to a helically or spirally developed cone. The upper edge 10 and lower edge 11 of the opening 3 conform to and are parallel to the pitch of the thread 8 for the purpose hereinafter to be described.

In the conical formation 2, there is movably mounted the valve portion 12 now to be described. It, see particularly Figs. 11 and 12 may be composed of the same material of which the tube 1 is composed or of any other suitable material such for instance as a bronze alloy or even a phenolic resinoid plastic such as "Bakelite" or the like and has an outer face consisting of the cylindrical portion 13 and the spiral conical portion 14 to conform substantially to the inner cylindrical face 9 and inner spiral conical face 15 of the conical formation 2. In addition, see particularly Fig. 11, there is formed a handle projection 16 which projects outwardly from the spiral conical face, one edge 17 of which is disposed more or less in alinement with the termination 18 of the spiral form of the spiral conical face 14. Preferably in one half of the spiral conical face 14 of the valve member 12 and which is the raised half of the spiral extended from the other half, there is provided the opening 19 and depressed in the outer face and extending from the opening 12 to the edge 18 there is the channel 20.

The lower edge 21 of the cylindrical portion 13 conforms to and is parallel to the spiral-shaped division 22 between the spiral conical portion 14 and the cylindrical portion 13. This spiral shape of course also conforms to the spiral shape of the thread 8 of the tube 1 and the inner division between the cylindrical surface 9 and the spiral conical surface 15 of the termination 2. It will be noted, however, that the outer face 21 while constituting a single spiral convolution has a recess 122 forming a continuation of the spiral face 21 receding from the cylindrical surface 13 and extending in degrees an arcuate length slightly in excess of the degrees of the arcuate length of the opening 3.

In attaching the valve member 12 to the tube 1, it is only necessary to insert te valve member 12 through the open lower end of the tube 1, naturally before it is filled, and positioning the handle 16 in the closed position, that shown in Fig. 5 where the end 23 of the spiral face 21 is in substantial alinement with the end 24 of the skirt 7. Thereupon, a tool is inserted and the edge of the skirt 7 rolled around the exposed face 21 of the valve member 12 to form the thread 8. When the thread forming tool is thereupon removed the valve member 12 will be anchored in position against displacement. It will also then appear that when the handle 16 is then rotated in a counter-clockwise direction looking at Fig. 2 that the thread 8 will then pass into the continuation 122, see Fig. 12 and the rotation be determined either by the engagement of the edge of the thread 8 with the end 25 of the continuation 122 or by the engagement of the handle 16 with the end 26 of the opening 3.

When moving into the closed position, on the other hand, the final closed position will be determined by the engagement of the shoulder 18 with the shoulder 28 of the formation 2.

In the operation of this valve after the tube 1 has been filled, it will be noted, see Fig. 8, that the shoulder 18 will engage or substantially engage the shoulder 28 at the end of the spiral convolution of the spiral conical inner face 15 and that in such position, the apex of the valve member 12 will substantially coincide with the inner apex of the formation 2 but that in the open position, the valve member 12 will press down into the contents with the edge 23 being advanced and that, see Fig. 9, an air-pocket 29 formed between the shoulder 28 and the shoulder 18 and the opposing spiral conical faces 14 and 15, see Fig. 9, the air being supplied into this air chamber through the channel 20 as soon as the opening 19 registers with the opening 3.

It will thus be seen that in the closing action, the air will be displaced and allowed to pass outwardly through the channel 20 while the advance edge 23 and the upward movement of the movable member 12 exercises a suction action on the contents to draw the same downwardly away from the opening 3. Advantage is taken of this suction action to prevent the disposition or formation of any secretions or extrusions on the face 14 of the valve member 12 at the end of the closing action.

It is obvious that various changes and modifications may be made to the details of construction without departing from the general spirit of the invention as set forth in the appended claims.

I claim:

1. The combination of two valve elements having interruptions to cooperate with one another either to close or open the valve and having closed conical spiral formations, one disposed within the other with coacting spiral faces, a spiral seat on one of said valve elements, and a flange initially extending axially from the other of said valve elements alongside of the spiral seat of said first valve element and moldable to be bent laterally into cooperative engagement with said spiral seat.

2. The combination of two closed conical valve elements having interruptions clearing one another in one axial position to form a valve opening and angularly removed from one another in another axial position to form a valve closure, with their co-acting spiral faces, a spiral seat at the open end of one of said valve elements, and a flange formed on the other valve element initially to extend axially at the open end thereof alongside of the spiral seat of said first valve element and moldable to be bent laterally into cooperative engagement with said spiral seat.

3. The combination of two closed conical valve elements having interruptions clearing one another in one axial position to form a valve opening and angularly displaceable relative to one another into another axial position to form a valve closure, with their co-acting spiral faces forming valve seats, a washer in one of said spiral faces surrounding one of said interruptions and in engagement with the other of said spiral faces, a spiral thread forming seat in one of said valve forming elements coaxial with the spiral face therein, and a flange on the other of said valve elements initially extending axially alongside of said spiral thread forming seat and moldable to be bent laterally into cooperative relation with said spiral seat.

4. The combination of two closed conical valve elements having interruptions clearing one another in one axial position to form a valve opening and angularly displaceable relative to one another into another axial position to form a valve closure with single convolution co-acting spiral faces, the spiral faces of said valve elements having shoulders forming the ends of the convolutions, a spiral thread forming seat in one of said valve elements and co-axial with the spiral face therein, the spiral of said seat exceeding a single convolution with a portion thereof undercut into an internal thread formation, and a flange formed on said other valve element initially extending axially alongside of said spiral thread forming seat and moldable to be bent laterally into cooperative engagement with said spiral seat.

5. The combination of two closed conical valve elements having interruptions clearing one another in one axial position to form a valve opening and angularly displaceable relative to one another into another axial position to form a valve closure, with their co-acting spiral faces forming valve seats, a handle extending from the spiral face of the inner of said valve elements and extending through the interruption in the other of said valve elements, and spiral thread formations on said valve elements co-axial with their respective spiral faces cooperating with said handle to anchor said valve elements in operative relation to one another.

6. The combination of two closed conical valve elements having interruptions clearing one another in one axial position to form a valve opening and angularly displaceable relative to one another into another axial position to form a valve closure, with their co-acting spiral faces forming valve seats, and spiral thread formations on said valve elements co-axial with their respective spiral faces to position said valve seats and therefore said valve elements in operative relation to one another.

7. The combination of two closed conical valve elements having interruptions clearing one another in one axial position to form a valve opening and angularly displaceable relative to one another into another axial position to form a valve closure with single convolution co-acting spiral faces forming cooperating valve seats, the spiral faces of said valve elements having shoulders forming the ends of the convolutions, and spiral thread formations on said valve elements co-axial with their respective spiral faces to position said valve seats and therefore said valve elements in operative relation to one another.

8. The combination of two closed conical valve elements having interruptions clearing one another in one axial position to form a valve opening and angularly displaceable relative to one another into another axial position to form a valve closure, with their co-acting spiral faces forming valve seats, a washer in one of said spiral seats adjacent to the edge of one of said interruptions and in engagement with the other of said spiral faces, and spiral thread formations on said valve elements co-axial with their respective spiral faces to position said valve seats and therefore said valve elements in operative relation to one another.

9. The combination of two closed valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, and spiral thread formations on said valve elements co-axial with their respective spiral faces to position said valve seats and therefore said valve elements in operative relation to one another.

10. The combination of two closed valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, a washer in one of said spiral faces around the interruption in said spiral face and in engagement with the other of said spiral faces, and spiral thread formations on said valve elements co-axial with their respective spiral faces to position said valve seats and therefore said valve elements in operative relation to one another.

11. The combination of two closed valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, a handle extending from the spiral face of the inner of said valve elements and extending through the interruption in the other of said valve elements, and spiral thread formations on said valve elements co-axial with their respective spiral faces to position said valve seats and therefore said valve elements in operative relation to one another.

12. The combination of two closed valve elements rotatable one within the other having interruptions clearing one another in one axial position to form a valve opening and angularly displaceable relative to one another into another axial position to form a valve closure, the outer of said valve elements having an inner single convolution spiral face, the inner of said valve elements having an outer single convolution spiral face in cooperative engagement with said inner spiral face to form valve seats for said valve elements, and spiral thread formations on said valve elements co-axial with their respective spiral faces to position said valve seats and therefore said valve elements in operative relation to one another.

13. The combination of a collapsible tube open at the bottom and having a closed upper valve forming element with an internal spiral face, a movable valve element with an external spiral face in slidable engagement with said internal spiral face, said valve elements having interruptions registering with one another in one axial position to form a valve opening and angularly displaceable relative to one another into another axial position to form a valve closure, a spiral thread forming seat on said movable valve element coaxial with its spiral face, and a flange on said closed valve forming element initially extending axially along the side of said spiral seat and moldable to be bent laterally over said spiral thread forming seat.

14. The combination of a collapsible tube open at the bottom and having a closed upper valve forming element with an internal spiral face, a moveable valve element with an external spiral face in slidable engagement with said internal spiral face, said valve elements having interruptions registering with one another in one axial position to form a valve opening and angularly displaceable relative to one another into another axial position to form a valve closure, a handle extending from the spiral face of said movable valve element and extending through the interruption in the closed valve forming element, a spiral thread forming seat on said movable valve element coaxial with its spiral face, and a flange on said closed valve forming element initially extending axially along the side of said spiral seat and moldable to be bent laterally over said spiral thread forming seat.

15. The combination of a collapsible tube open at the bottom and having a closed upper valve forming element with an internal spiral face, a movable valve element with an external spiral face in slidable engagement with said internal spiral face, said valve elements having interruptions registering with one another in one axial position to form a valve opening and angularly displaceable relative to one another into another axial position to form a valve closure, a washer mounted on said closed valve element around its spiral face and in engagement with the spiral face of said movable valve element, a spiral thread forming seat on said movable valve element coaxial with its spiral face, and a flange on said closed valve forming element initially extending axially along the side of said spiral seat and moldable to be bent laterally over said spiral thread forming seat.

16. The combination of two closed valve elements rotatable one within the other having interruptions clearing one another in one axial position to form a valve opening and angularly displaceable relative to one another into another axial position to form a valve closure, the outer of said valve elements having an inner single convolution spiral face, the inner of said valve elements having an outer single convolution spiral face in cooperative engagement with said inner spiral face to form valve seats for said valve elements, shoulders on said valve elements defining the ends of said spiral faces, a recess in said outer spiral face connecting the interruption in the inner of said valve elements with its shoulder to permit the passage of air into the chamber formed between said shoulders when said inner valve element is actuated into valve opening position, and spiral thread formations on said valve elements co-axial with their respective spiral faces to position said valve seats and therefore said valve elements in operative relation to one another.

17. The combination of two closed valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, shoulders on said valve elements defining the ends of said spiral faces, a recess in the spiral face of said inner valve element extending from its interruption to its shoulder to permit the passage of air into the chamber between said shoulders when said inner valve element is moved into valve opening position, a spiral thread forming seat on the inner valve element co-axial with its spiral face, and a flange on the outer valve element initially extending axially along the outside of said spiral thread forming seat and moldable to be bent inwardly into cooperative engagement with said spiral seat.

18. The method of opening the closure of a collapsible tube previously filled with a plastic material and subsequently closing the same consisting in advancing toward the mouth of the closure a part of the plastic material and simultaneously displacing the part so advanced with an air pocket while opening the closure and subsequently discharging the air so pocketed and withdrawing inwardly the plastic material from the mouth of the closure to replace the void so created by discharging the air while closing the closure.

19. The combination of two valve elements having interruptions to cooperate with one another either to close or open the valve and having conical spiral formations, one disposed within the other with coacting spiral faces, a spiral seat on one of said valve elements, and a flange initially extending axially from the other of said valve elements alongside of the spiral seat of said first valve element and moldable to be bent laterally into cooperative engagement with said spiral seat.

20. The combination of two conical valve elements having coacting spiral faces forming valve seats and interruptions clearing one another in one axial position to form a valve opening and angularly removed from one another in another axial position to form a valve closure, with their co-acting spiral faces, a spiral seat at the open end of one of said valve elements, and a flange formed on the other valve element initially to extend axially at the open end thereof alongside of the spiral seat of said first valve element and moldable to be bent laterally into cooperative engagement with said spiral seat.

21. The combination of two conical valve elements having co-acting spiral faces forming valve seats and interruptions clearing one another in one axial position to form a valve opening and angularly displaceable relative to one another into another axial position to form a valve closure, with their co-acting spiral faces forming valve seats, a washer in one of said spiral faces surrounding one of said interruptions and in engagement with the other of said spiral faces, a spiral thread forming seat in one of said valve forming elements and a flange on the other of said valve elements initially extending axially alongside of said spiral thread forming seat and moldable to be bent laterally into cooperative relation with said spiral seat.

22. The combination of two conical valve elements having co-acting spiral faces forming valve seats and having interruptions clearing one another in one axial position to form a valve opening and angularly displaceable relative to one another into another axial position to form a valve closure with single convolution co-acting spiral faces, the spiral faces of said valve elements having shoulders forming the ends of the convolutions, a spiral thread forming seat in one of said valve elements, the spiral of said seat exceeding a single convolution with a portion thereof undercut into an internal thread formation, and a flange formed on said other valve element initially extending axially alongside of said spiral thread forming seat and moldable to be bent laterally into cooperative engagement with said spiral seat.

23. The combination of two conical valve elements having co-acting spiral faces forming valve seats and having interruptions clearing one another in one axial position to form a valve opening and angularly displaceable relative to one another into another axial position to form a valve closure, with their co-acting spiral faces forming valve seats, a handle extending from the spiral face of the inner of said valve elements and extending through the interruption in the other of said valve elements, and spiral thread formations on said valve elements cooperating with said handle to anchor said valve elements in operative relation to one another.

24. The combination of two conical valve elements having co-acting spiral faces forming valve seats and interruptions clearing one another in one axial position to form a valve opening and angularly displaceable relative to one another into another axial position to form a valve closure, with their co-acting spiral faces forming valve seats, and spiral thread formations on said valve elements to position said valve seats and therefore said valve elements in operative relation to one another.

25. The combination of two conical valve elements having co-acting spiral faces forming valve seats and interruptions clearing one another in one axial position to form a valve opening and angularly displaceable relative to one another into another axial position to form a valve closure with single convolution co-acting spiral faces forming cooperating valve seats, the spiral faces of said valve elements having shoulders forming the ends of the convolutions, and spiral thread formations on said valve elements to position said valve seats and therefore said valve elements in operative relation to one another.

26. The combination of two conical valve elements having co-acting spiral faces forming valve seats and interruptions clearing one another in one axial position to form a valve opening and angularly displaceable relative to one another into another axial position to form a valve closure, with their co-acting spiral faces forming valve seats, a washer in one of said spiral seats adjacent to the edge of one of said interruptions and in engagement with the other of said spiral faces, and spiral thread formations on said valve elements to position said valve seats and therefore said valve elements in operative relation to one another.

27. The combination of two valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, and spiral thread formations on said valve elements to position said valve seats and therefore said valve elements in operative relation to one another.

28. The combination of two valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, a washer in one of said spiral faces around the interruption in said spiral face and in engagement with the other of said spiral faces, and spiral thread formations on said valve elements to position said valve seats and therefore said valve elements in operative relation to one another.

29. The combination of two valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, a handle extending from the spiral face of the inner of said valve elements and extending through the interruption in the other of said valve elements, and spiral thread formations on said valve elements to position said valve seats and therefore said valve elements in operative relation to one another.

30. The combination of two valve elements rotatable one within the other having interruptions clearing one another in one axial position to form a valve opening and angularly displaceable relative to one another into another axial position to form a valve closure, the outer of said valve elements having an inner single convolution spiral face, the inner of said valve elements having an outer single convolution spiral face in cooperative engagement with said inner spiral face to form valve seats for said valve elements, and spiral thread formations on said valve elements to position said valve seats and therefore said valve elements in operative relation to one another.

31. The combination of a collapsible tube having a closed upper valve forming element with an internal spiral face, a movable valve element with an external spiral face in slidable engagement with said internal spiral face, said valve elements having interruptions registering with one another in one axial position to form a valve opening and angularly displaceable relative to one another into another axial position to form a valve closure, a spiral thread forming seat on said movable valve element, and a flange on said closed valve forming element initially extending axially along the side of said spiral seat and moldable to be bent laterally over said spiral thread forming seat.

32. The combination of a collapsible tube having a closed upper valve forming element with an internal spiral face, a movable valve element with an external spiral face in slidable engagement with said internal spiral face, said valve elements having interruptions registering with one another in one axial position to form a valve opening and angularly displaceable relative to one another into another axial position to form a valve closure, a handle extending from the spiral face of said movable valve element and extending through the interruption in the closed valve forming element, a spiral thread forming seat on said movable valve element, and a flange on said closed valve forming element initially extending axially along the side of said spiral seat and moldable to be bent laterally over said spiral thread forming seat.

33. The combination of a collapsible tube having a closed upper valve forming element with an internal spiral face, a movable valve element with an external spiral face in slidable engagement with said internal spiral face, said valve elements having interruptions registering with one another in one axial position to form a valve opening and angularly displaceable relative to one another into another axial position to form a valve closure, a washer mounted on said closed valve element around its spiral face and in engagement with the spiral face of said movable valve element, a spiral thread forming seat on said movable valve element, and a flange on said closed valve forming element initially extending axially along the side of said spiral seat and moldable to be bent laterally over said spiral thread forming seat.

34. The combination of two valve elements rotatable one within the other having interruptions clearing one another in one axial position to form a valve opening and angularly displaceable relative to one another into another axial position to form a valve closure, the outer of said valve elements having an inner single convolution spiral face, the inner of said valve elements having an outer single convolution spiral face in cooperative engagement with said inner spiral face to form valve seats for said valve elements, shoulders on said valve elements defining the ends of said spiral faces, a recess in said outer spiral face connecting the interruption in the inner of said valve elements with its shoulder to permit the passage of air into the chamber formed between said shoulders when said inner valve element is actuated into valve opening position, and spiral thread formations on said valve elements to position said valve seats and therefore said valve elements in operative relation to one another.

35. The combination of two valve elements rotatable one within the other and having interruptions clearing one another in one axial position to form a valve opening and angularly displaceable relative to one another into another axial position to form a valve closure, the outer of said valve elements having an inner spiral face, the inner of said valve elements having an outer spiral face in cooperative engagement with said inner spiral face to form valve seats for said valve elements, shoulders on said valve elements defining the ends of said spiral faces, a recess in the spiral face of said inner valve element extending from its interruption to its shoulder to permit the passage of air into the chamber between said shoulders when said inner valve element is moved into valve opening position, a spiral thread forming seat on the inner valve element, and a flange on the outer valve element initially extending axially along the outside of said spiral thread forming seat and moldable to be bent inwardly into cooperative engagement with said spiral seat.

36. The combination of two valve elements having closed ends, one rotatable within the other and having interruptions clearing one another in one axial position to form a valve opening and angularly displaceable relative to one another into another axial position to form a valve closure, shoulders on said valve elements defining the valve closure position, and a recess in the outer face of the inner rotatable element and terminating at its shoulder to permit the passage of air into the chamber formed between said shoulders when said inner rotatable member is moved into open position.

37. The combination of two valve elements one rotatable within the other and having interruptions clearing one another in one axial position to form a valve opening and angularly displaceable relative to one another into another axial position to form a valve closure, and shoulders on said valve elements engaging one another to define the valve closure position and forming an air chamber between them when they are separated as the valve elements are rotated into open position.

38. The combination of two valve elements, one rotatable within the other and having interruptions clearing one another in one axial position to form a valve opening and angularly displaceable relative to one another into another axial position to form a valve closure, and shoulders on the opposing faces of said valve elements engaging one another to define the valve closure position and forming an air chamber between them when they are separated as the valve elements are rotated into open position.

39. The combination of two valve elements, one rotatable within the other and having interruptions clearing one another in one axial position to form a valve opening and angularly displaceable relative to one another into another axial position to form a valve closure, and shoulders on the opposing faces of said valve elements engaging one another to define the valve closure position and movable away from one another as the valve elements are rotated into valve opening position, there being a communication between said valve elements and the shoulder of said inner rotatable element to permit the passage of air to the chamber formed between said shoulders when said valve elements are rotatable into valve opening position.

40. The combination of two valve elements, one rotatable within the other and having interruptions clearing one another in one axial position to form a valve opening and angularly displaceable relative to one another into another axial position to form a valve closure, and shoulders on the opposing faces of said valve elements engaging one another to define the valve closure position and movable away from one another as the valve elements are rotated into valve opening position, there being a communication formed in the outer face of said inner rotatable element between its interruption and its shoulder to permit the passage of air to the chamber formed between said shoulders when said valve elements are rotatable into valve opening position.

41. The combination of two valve elements, one movable within the other having interruptions clearing one another in one position to form a valve opening and displaceable relative to one another into another position to form a valve closure, devices associated with said valve elements forming an air chamber between them in valve opening position and cooperating to eliminate said chamber in turn to discharge the trapped air and thereby diminish the internal pressure to suck the contents adjacent the opening inwardly away from the closure to prevent any objectionable secretion during the closing operation.

JAMES HANSEN.